(12) United States Patent
Shin et al.

(10) Patent No.: US 11,990,637 B2
(45) Date of Patent: May 21, 2024

(54) SECONDARY BATTERY CELL

(71) Applicant: SK ON CO., LTD., Seoul (KR)

(72) Inventors: Jae Sik Shin, Daejeon (KR); Seung Hoon Ju, Daejeon (KR); Ji Yong Park, Daejeon (KR); Jae Gyu Byun, Daejeon (KR); Gi Jeong Seo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/332,750

(22) Filed: Jun. 12, 2023

(65) Prior Publication Data

US 2023/0411778 A1 Dec. 21, 2023

(30) Foreign Application Priority Data

Jun. 15, 2022 (KR) .................. 10-2022-0072821
Apr. 4, 2023 (KR) .................. 10-2023-0043968

(51) Int. Cl.
*H01M 50/15* (2021.01)
*H01M 50/103* (2021.01)
*H01M 50/342* (2021.01)

(52) U.S. Cl.
CPC ..... *H01M 50/3425* (2021.01); *H01M 50/103* (2021.01); *H01M 50/15* (2021.01)

(58) Field of Classification Search
CPC . H01M 50/15; H01M 50/103; H01M 50/3425
See application file for complete search history.

(56) References Cited

U.S. PATENT DOCUMENTS

| 2007/0099070 | A1* | 5/2007 | Aizawa | ............. | H01M 50/3425 |
| | | | | | 429/82 |
| 2009/0068548 | A1* | 3/2009 | Kaplan | ................. | H01M 4/661 |
| | | | | | 429/163 |
| 2011/0206957 | A1* | 8/2011 | Byun | ................ | H01M 50/3425 |
| | | | | | 429/56 |
| 2012/0219834 | A1* | 8/2012 | Park | .................. | H01M 50/3425 |
| | | | | | 429/89 |
| 2015/0024241 | A1 | 1/2015 | Kim et al. | | |
| 2019/0237729 | A1* | 8/2019 | Lee | ....................... | H01M 50/30 |

FOREIGN PATENT DOCUMENTS

| KR | 10-1087057 B1 | 11/2011 |
| KR | 10-1347715 B1 | 1/2014 |
| KR | 10-1711984 B1 | 3/2017 |

* cited by examiner

*Primary Examiner* — Kenneth J Douyette
(74) *Attorney, Agent, or Firm* — IP & T GROUP LLP

(57) ABSTRACT

A secondary battery cell includes: a case in which an electrode assembly is accommodated; a cap plate assembly coupled to at least one side of the case; and a venting unit including a base coupled to one surface of the case and a notch portion formed on the base, and the notch portion includes: a first notch portion extending in a first direction, parallel to a longitudinal direction of the base; a second notch portion extending in a second direction, perpendicular to the first direction, from both ends of the first notch portion, respectively; and a third notch portion extending in the first direction from both ends of the second notch portion, respectively.

14 Claims, 8 Drawing Sheets

SECONDARY BATTERY CELL

CROSS-REFERENCE TO RELATED APPLICATION(S)

This patent document claims the priority and benefits of Korean Patent Application No. 10-2022-0072821 filed on Jun. 15, 2022, and 10-2023-0043968 filed on Apr. 4, 2023, the disclosures of which are incorporated herein by reference in its entirety.

TECHNICAL FIELD

The technology and implementations disclosed in this patent document generally relate to a secondary battery cell.

BACKGROUND

Recently, demand for secondary batteries as energy sources has been rapidly increasing.

A secondary battery refers to a battery capable of repeating charging and discharging due to reversible interconversion between chemical energy and electrical energy.

On the other hand, since there may be a risk of explosion in the secondary battery for various reasons, a vent structure is applied to prepare for the risk. The vent structure is configured to emit gas generated inside the secondary battery to the outside by fracturing when pressure inside a case is above a certain level.

SUMMARY

The disclosed technology can be implemented in some embodiments to provide a secondary battery cell including a venting unit that may be fractured with high reliability in a predetermined specific fracture pressure range.

In some embodiments of the disclosed technology, a secondary battery cell may include: a case in which an electrode assembly is accommodated; a cap plate assembly coupled to at least one side of the case; and a venting unit including a base coupled to one surface of the case and a notch portion formed on the base, wherein the notch portion may include: a first notch portion extending in a first direction, parallel to a longitudinal direction of the base; a second notch portion extending in a second direction, perpendicular to the first direction, from both ends of the first notch portion, respectively; and a third notch portion extending in the first direction from both ends of the second notch portion, respectively.

In some embodiments of the disclosed technology, the venting unit may be provided on at least one of two side surfaces facing each other in the longitudinal direction of the case and two side surfaces facing each other in a height direction of the case.

In some embodiments of the disclosed technology, the third notch portion may extend in the first direction toward an inside of the base.

In some embodiments of the disclosed technology, the second notch portion may extend in the second direction to at least a portion on which stress is concentrated in the base, and the third notch portion may extend in the first direction from a portion on which the stress of the base is concentrated.

In some embodiments of the disclosed technology, the notch portion may be formed to satisfy the following conditional equation, [Conditional Equation] $64.4 \leq 100*c/a \leq 64.8$, where a is a length of the base, and c is a length of the first notch portion).

In some embodiments of the disclosed technology, the notch portion may be formed to satisfy the following conditional equation, [Conditional Equation] $19.8 \leq 100*c/a \leq 20.2$, where c is the length of the first notch portion, and e is a length of the third notch portion.

In some embodiments of the disclosed technology, the notch portion may be formed to satisfy the following conditional equation, [Conditional Equation] $53.7 \leq 100*d/b \leq 54.4$, where b is a width of the base, and d is a length of the second notch portion.

In some embodiments of the disclosed technology, the notch portion may be formed to satisfy the following conditional equation, [Conditional Equation] $98.3 \leq 100*e/f \leq 101.7$, where e is the length of the third notch portion, and f is a gap between the first notch portion and the third notch portion.

In some embodiments of the disclosed technology, the base may include a groove formed along the first to third notch portions on a surface facing an interior of the case, and, the groove may be formed to satisfy the following conditional equation, [Conditional Equation] $0.26 \leq g2/g1 \leq 0.8$, where g1 is a width of the groove, and g2 is a depth of the groove.

In some embodiments of the disclosed technology, the venting unit may be configured to be fractured when internal pressure (P) of the case satisfies the following conditional equation, [Conditional Equation] $0.80 \text{ [MPa]} \leq P \leq 0.90 \text{ [MPa]}$.

According to some embodiments of the disclosed technology, a venting unit may control an emission direction of gas and may be fractured with high reliability in a predetermined specific fracture pressure range.

BRIEF DESCRIPTION OF DRAWINGS

Certain aspects, features, and advantages of the disclosed technology are illustrated by the following detailed description with reference to the accompanying drawings.

DETAILED DESCRIPTION

Hereinafter, embodiments of the disclosed technology will be described in detail with reference to the drawings.

However, the concept of the disclosed technology is not limited to presented embodiments.

For example, those skilled in the art who understand the concept of disclosed technology may easily propose other embodiments included within the scope of the disclosed technology by adding, modifying, or deleting components, but these additions, modifications, or deletions should be construed as being included in the scope of the disclosed technology.

In the following descriptions, the terms "connected to" or "coupled to" are used to designate a connection or coupling of one element to another element and include both a case where an element is "directly connected or coupled to" another element and a case where an element is "indirectly connected or coupled to" another element via still another element. Furthermore, when a certain portion "includes" or "comprises" a certain component, this indicates that other components are not excluded and may be further included unless otherwise noted.

Furthermore, it will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosed technology.

Hereinafter, a secondary battery cell according to embodiments of the disclosed technology disclosed in this patent document are described with reference to the accompanying drawings.

Figure 1:
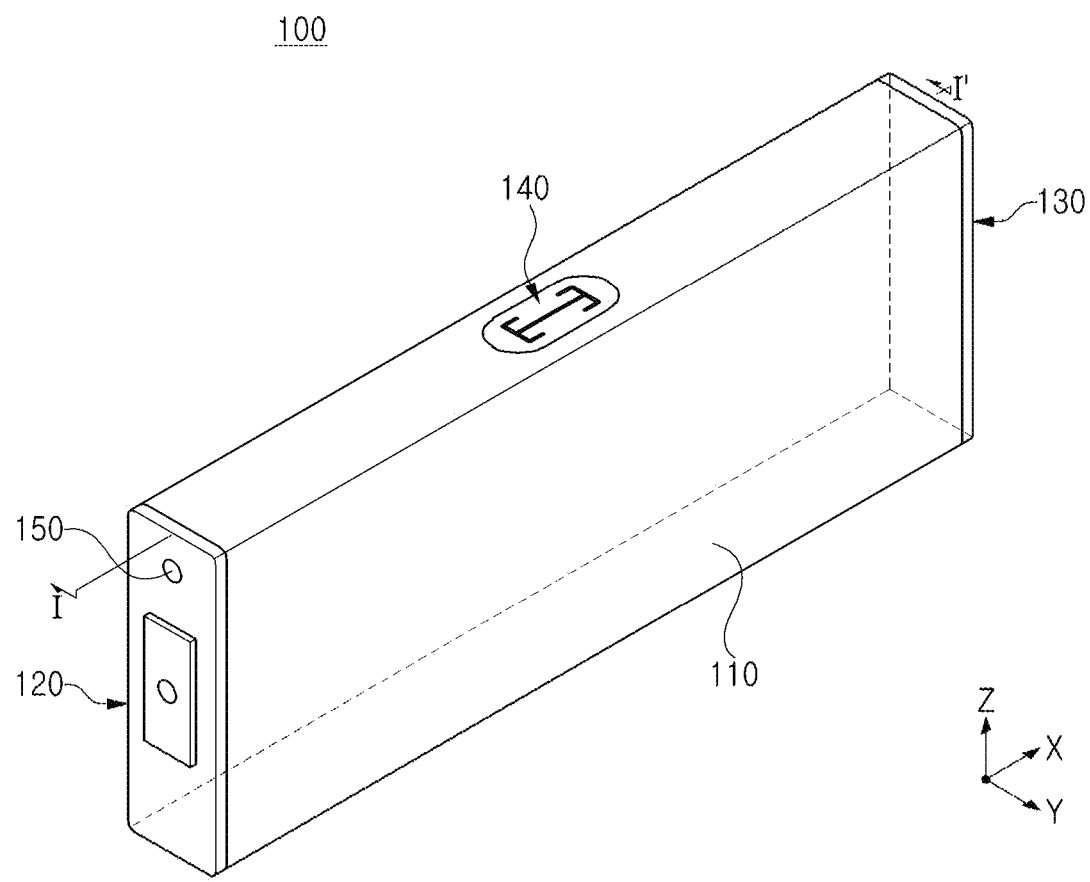
FIG. 1 is a perspective view of a secondary battery cell according to an embodiment of the disclosed technology.
Figure 2:
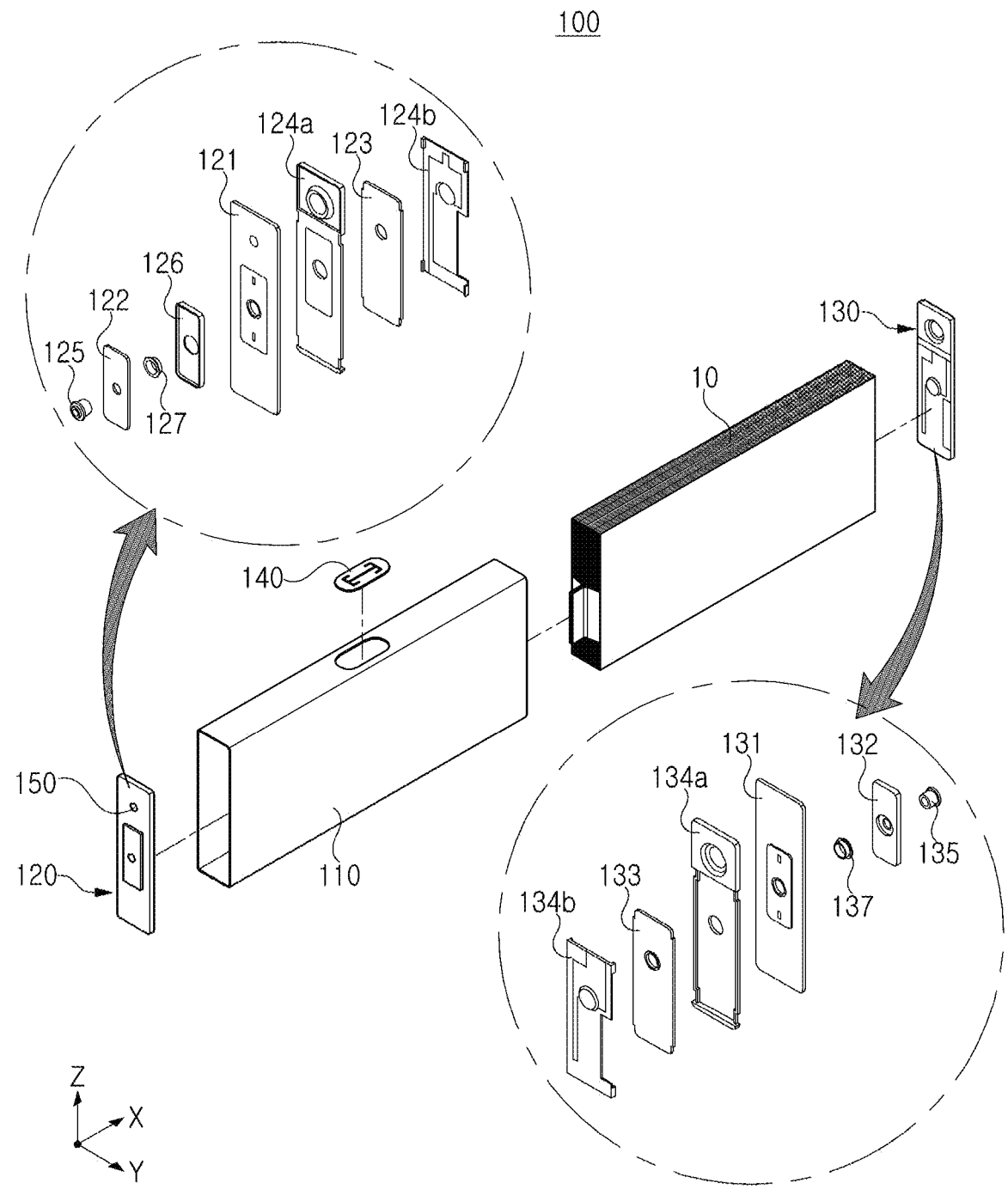
FIG. 2 is an exploded perspective view of a secondary battery cell according to an embodiment of the disclosed technology.
Figure 3:
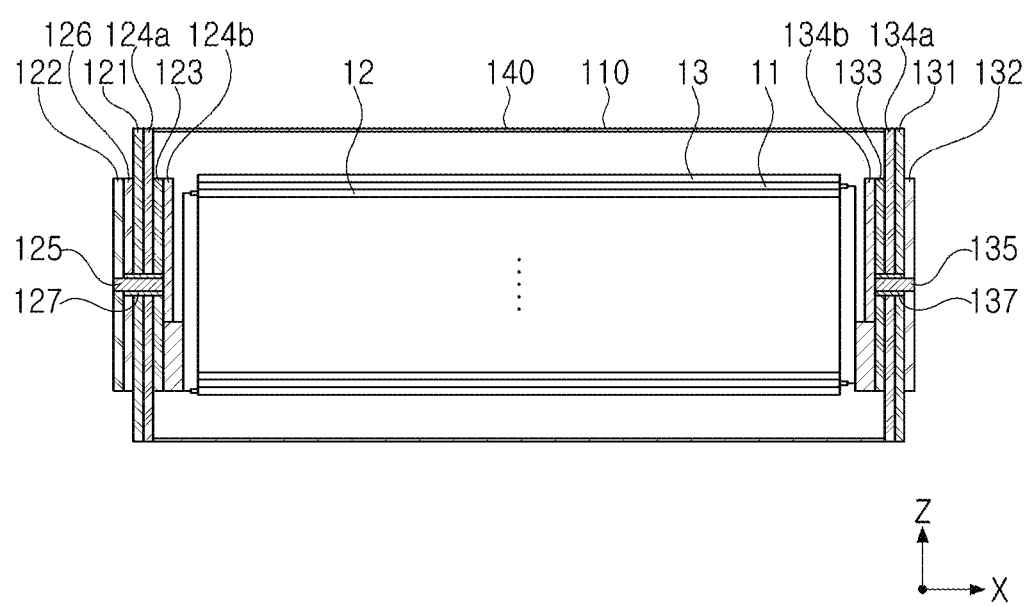
FIG. 3 is a cross-sectional view taken along line I-I' of FIG. 1.

FIG. 1 is a perspective view of a secondary battery cell according to an embodiment of the disclosed technology, FIG. 2 is an exploded perspective view of a secondary battery cell according to an embodiment of the disclosed technology, and FIG. 3 is a cross-sectional view taken along line I-I' of FIG. 1.

As illustrated in the drawings, a secondary battery cell 100 according to an embodiment of the disclosed technology may be a prismatic secondary battery cell, and may include a case 110, cap plate assemblies 120 and 130, and a venting unit 140.

The case 110 may form an external appearance of the secondary battery cell 100, and may be formed of aluminum or a material including aluminum. However, a material of the case 110 is not limited thereto. Furthermore, because the secondary battery cell 100 of the disclosed technology is formed in a prismatic type, the case 110 may have a flat and angular shape.

An electrode assembly 10 and an electrolyte (not illustrated) may be accommodated in the case 110. The electrode assembly 10 may include a negative electrode (plate) 12, a positive electrode (plate) 13, and a separating film 11 as an insulator interposed between the negative electrode (plate) 12 and the positive electrode (plate) 13. The electrode assembly 10 may be provided in a stack type in which the negative electrode (plate) 12, the positive electrode (plate) 13, and the separating film 11 are alternately stacked, or in a jelly roll type in which the stacked negative electrode (plate) 12, positive electrode (plate) 13, and separating film 11 are wound together.

Figure 8:
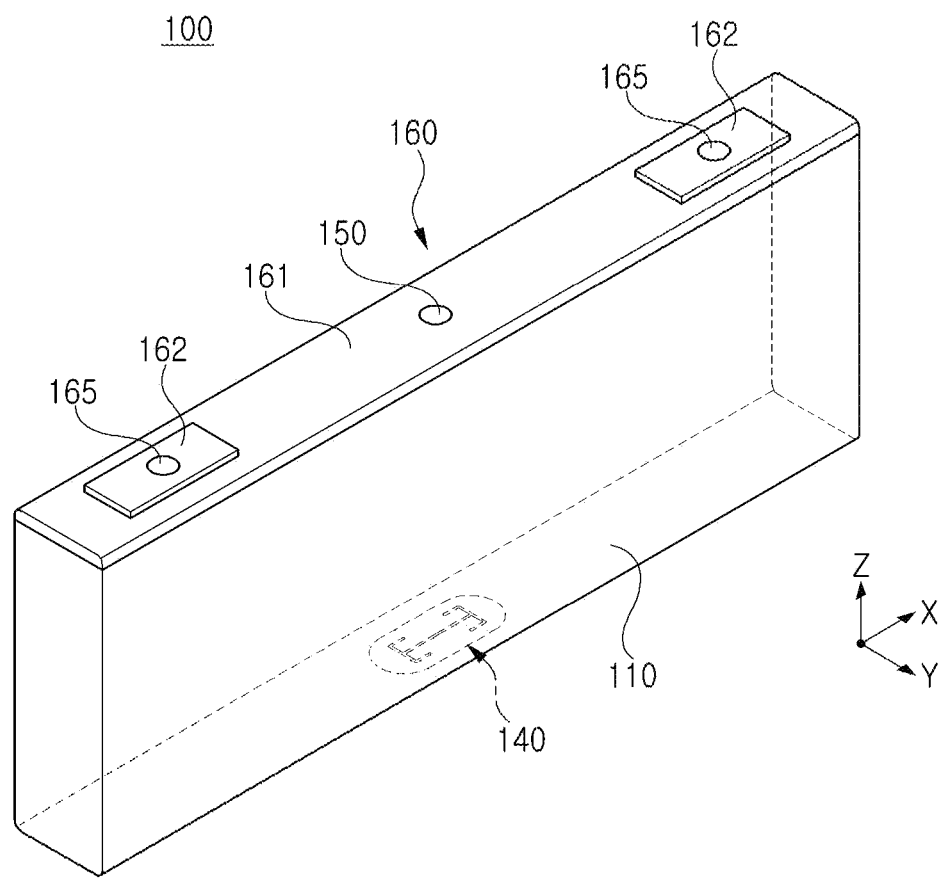
FIG. 8 is a perspective view of a secondary battery cell according to the other embodiments of the disclosed technology.
Figure 9:
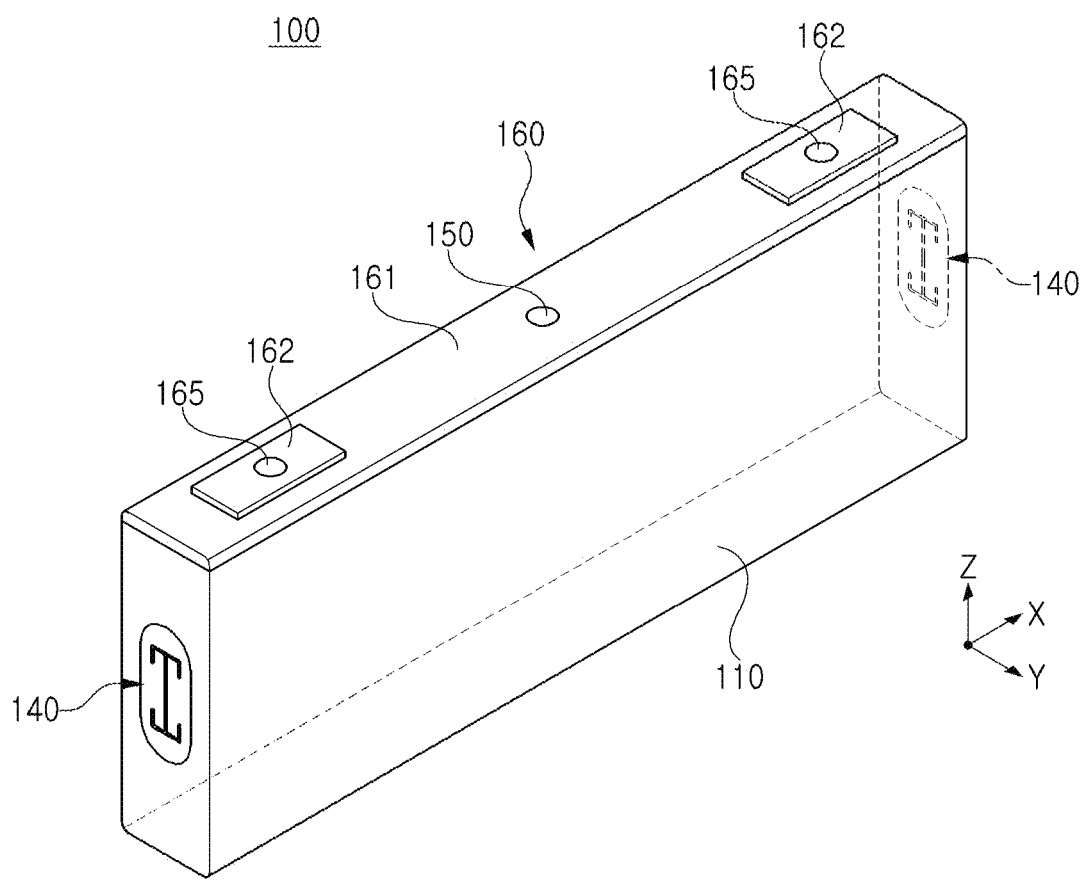
FIG. 9 is a perspective view of a secondary battery cell according to another embodiment of the disclosed technology.

According to an embodiment of the disclosed technology, the cap plate assemblies 120 and 130 may be coupled to both sides of the case 110 in a longitudinal direction, respectively. Alternatively, in the other embodiments of the disclosed technology, a cap plate assembly 160 may be coupled to one side of the case 110. An embodiment in which the cap plate assembly 160 is coupled to one side of the case 110 is illustrated in FIGS. 8 and 9.

The cap plate assemblies 120 and 130 may be comprised of a plurality of components, and the components constituting the cap plate assemblies 120 and 130 will be described below.

The cap plate assemblies 120 and 130 may include cap plates 121 and 131 coupled to the case 110 to seal the case 110. For example, the cap plates 121 and 131 may be formed of aluminum or a material containing aluminum, and may be laser-welded to the case 110 along an edge thereof. Meanwhile, when the cap plates 121 and 131 are coupled to the case 110, because an interior of the case 110 is sealed, one of the cap plates 121 and 131 may include an electrolyte inlet 150 for injecting an electrolyte into the case 110. The electrolyte inlet 150 may be sealed with a plug or the like after injecting the electrolyte.

The cap plate assemblies 120 and 130 may include terminal plates 122 and 132. The terminal plates 122 and 132 may be coupled to one surface of the cap plates 121 and 131. One surface of the cap plates 121 and 131 may be a surface opposite to a surface facing the interior of the case 110. When forming a module or pack, the secondary battery cell 100 may be electrically connected to another secondary battery cell 100 disposed adjacent to each other through the terminal plates 122 and 132.

The terminal plates 122 and 132 may have a positive polarity or a negative polarity. For example, based on the drawings, the terminal plate 122 disposed on a left side of the case 110 in the longitudinal direction may have a negative polarity, and the terminal plate 132 disposed on a right side of the case 110 in the longitudinal direction may have a positive polarity. Meanwhile, because the terminal plates 122 and 132 are disposed on the cap plates 121 and 131, an insulating plate (i.e., an external insulating plate) 126 may be further disposed between the terminal plate 122 having the negative polarity and the cap plate 121.

Current collecting plates 123 and 133 may be disposed on the other surfaces of the cap plates 121 and 131. The current collecting plates 123 and 133 may be connected to an electrode tab of the negative electrode (plate) 12 or the positive electrode (plate) 13 of the electrode assembly 10 and may have a positive polarity or a negative polarity. Furthermore, insulating plates (i.e., internal insulating plates) 124 (124a, 124b) and 134 (134a, 134b) may be disposed between the cap plates 121 and 131 and the current collecting plates 123 and 133 and between the current collecting plates 123 and 133 and an internal space of the case 110, respectively.

Meanwhile, according to an embodiment of the disclosed technology, the cap plate assemblies 120 and 130 may include rivet terminals 125 and 135 that pass from the terminal plates 122 and 132 to the current collecting plates 123 and 133 in a thickness direction. To this end, the cap plates 121 and 131, the terminal plates 122 and 132, the current collecting plates 123 and 133, and some insulating plates 124, 129 and 134) may include holes into which the rivet terminals 125 and 135 are inserted, and gaskets 127 and 137 may be inserted between the holes and the rivet terminals 125 and 135.

As illustrated in FIGS. 8 and 9, according to the other embodiments of the disclosed technology, in the secondary battery cell 100, the cap plate assembly 160 may be coupled to one side of the case 110, and thus the above-described components may be disposed on one cap plate 161. Although polarities are not distinguished in FIGS. 8 and 9, one of two terminal plates 162 may have a negative polarity and the other thereof may have a positive polarity.

Because the components of the cap plate assembly 120, 130 and 160 described above are only an embodiment, some of the components of the cap plate assembly 120, 130 and 160 may be omitted or other components that are not described may be added.

According to an embodiment of the disclosed technology, the case 110 may include a venting unit 140 for emitting gas generated inside the case 110. The venting unit 140 may be provided on a side surface with a relatively large stress value among the remaining surfaces of the case 110 except for a portion in which the cap plate assemblies 120 and 130 are coupled, that is, an upper surface and/or a lower surface of the case 110 based on the drawings.

In the conventional art, the venting unit is generally provided on the cap plate, but when the venting unit 140 is formed on the case 110 as in the disclosed technology, a degree of design freedom may be improved in a module unit and a pack unit. Specifically, as in an embodiment of the disclosed technology, in the embodiment in which the cap plate assemblies 120 and 130 are coupled to both sides of the case 110 in the longitudinal direction, the venting unit 140 may be provided on the upper surface and/or the lower surface of the case 110; however, in the embodiment in which the cap plate assembly 160 is coupled to one side of the case 110 in the height direction, as illustrated in FIGS. 8 and 9, the venting unit 140 may be provided on one side or both sides of the case 110 in the longitudinal direction in addition to the lower surface of the case 110, thereby forming a flow path through which gas flows more freely in the module unit and the pack unit.

According to an embodiment of the disclosed technology, the venting unit 140 may include a base 141 coupled to the case 110 and a notch portion 142 that is fractured at a predetermined pressure or higher.

Figure 4A:
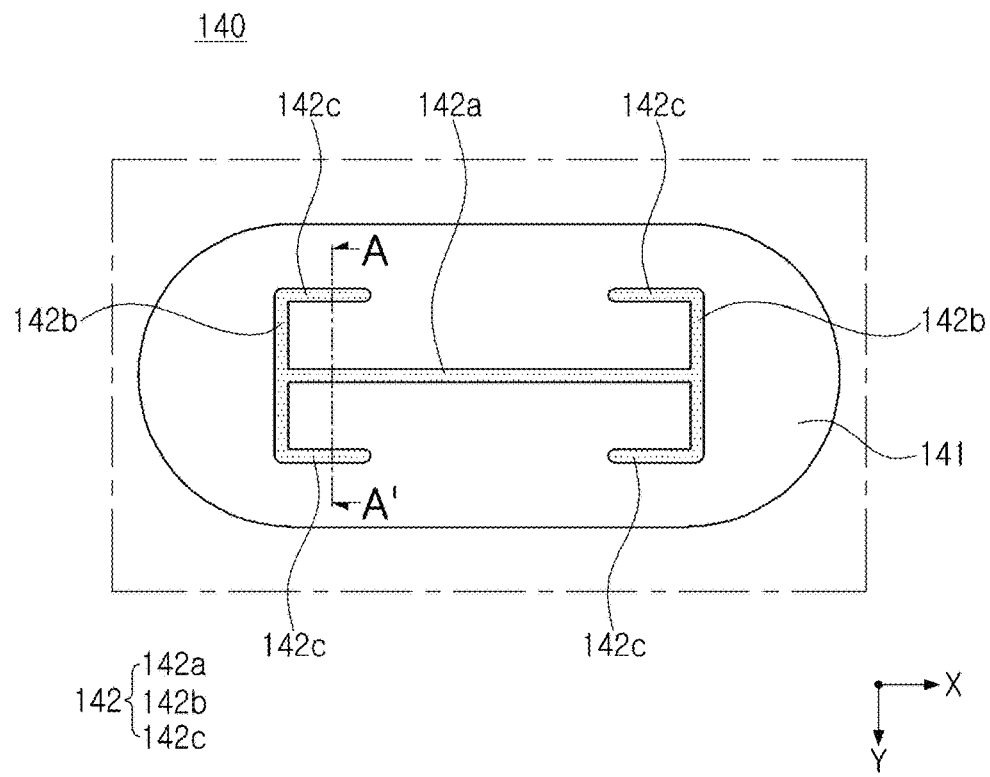
FIGS. 4A and 4B are plan views of a venting unit according to an embodiment of the disclosed technology.
Figure 4B:
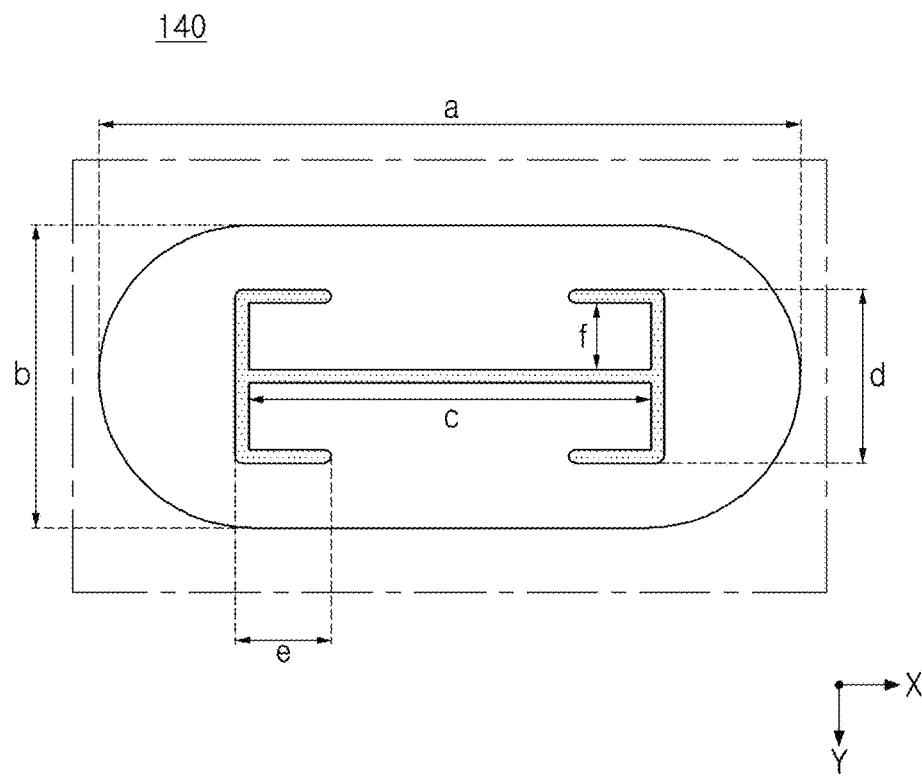
Figure 5:
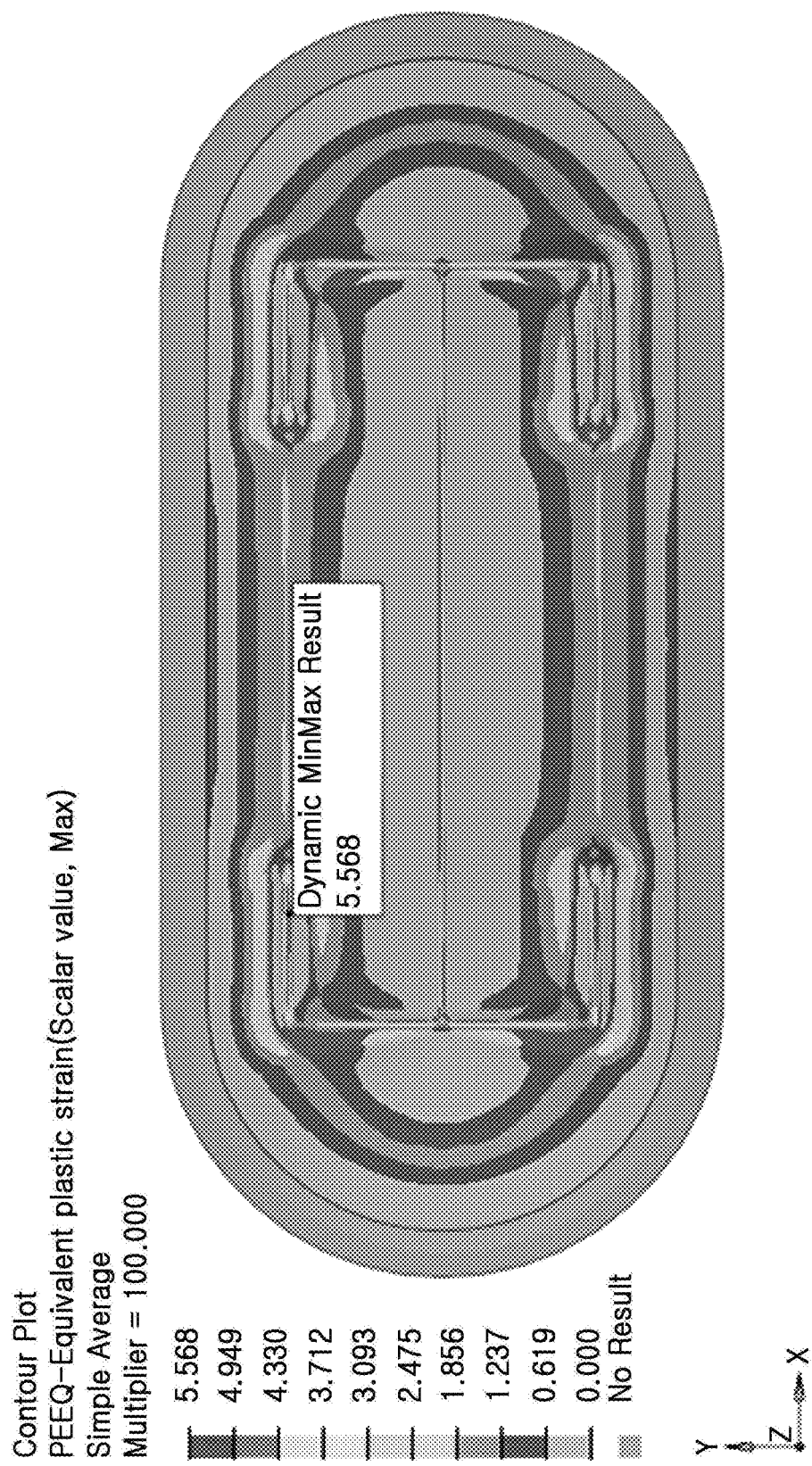
FIG. 5 is a cross-sectional view taken along line A-A' of FIG. 4A.
Figure 6:
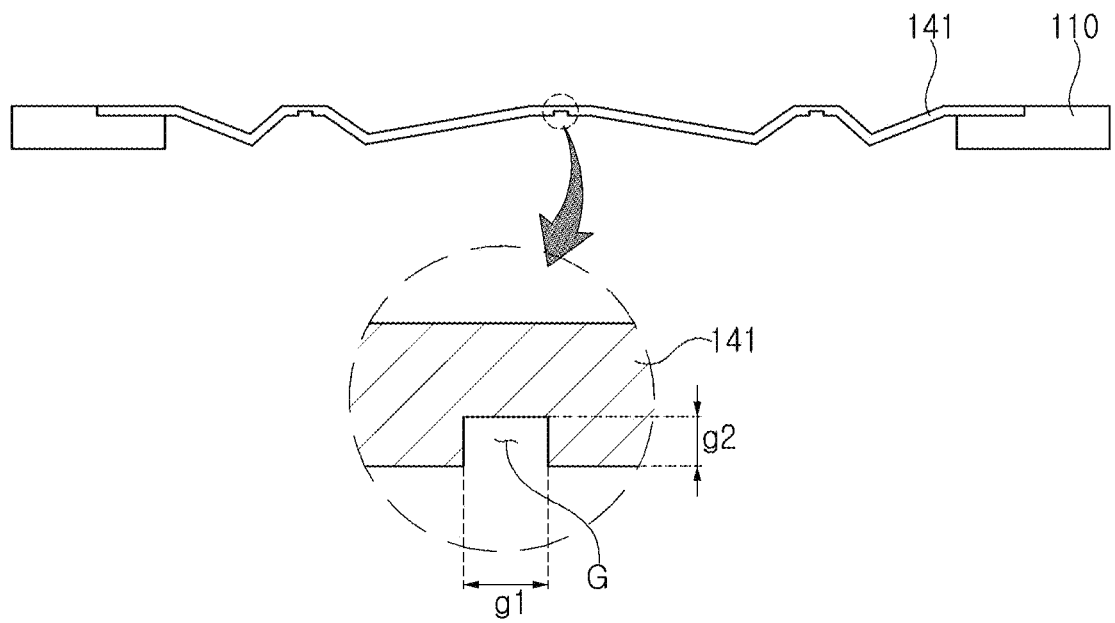
FIG. 6 is a view illustrating a stress distribution of the venting unit illustrated in FIGS. 4A and 4B.
Figure 7:
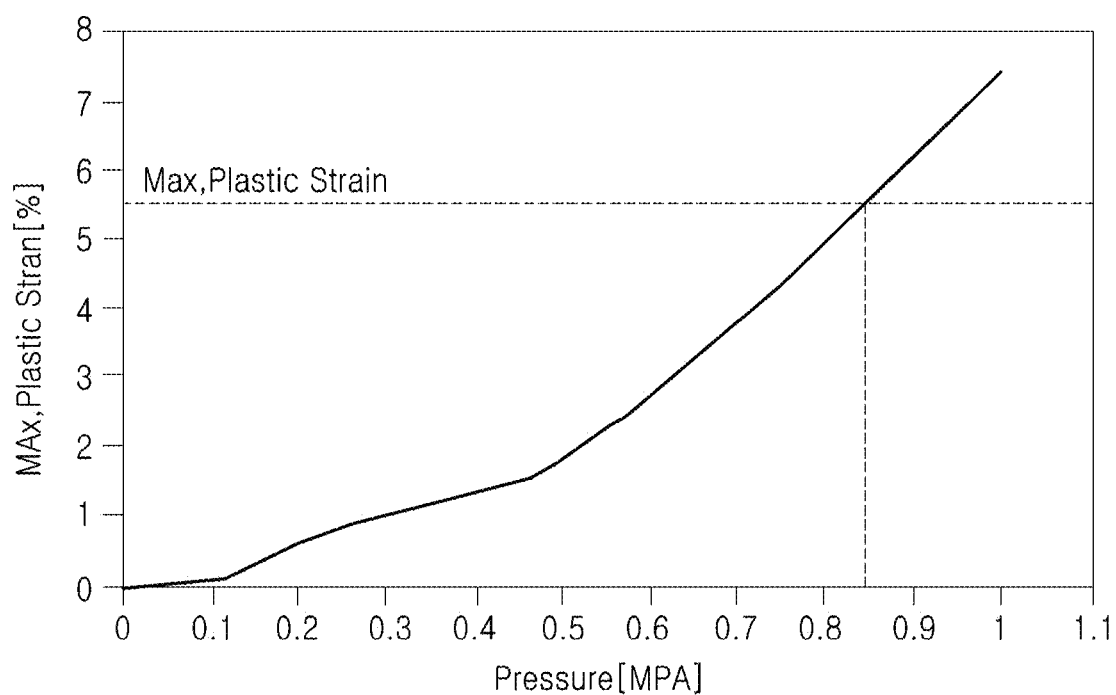
FIG. 7 is a graph illustrating fracture pressure of the venting unit illustrated in FIGS. 4A and 4B.

FIGS. 4A and 4B are plan views of a venting unit according to an embodiment of the disclosed technology, FIG. 5 is a cross-sectional view taken along line A-A' of FIG. 4A, FIG. 6 is a view illustrating a stress distribution of the venting unit illustrated in FIGS. 4A and 4B, and FIG. 7 is a graph illustrating fracture pressure of the venting unit illustrated in FIGS. 4A and 4B.

Referring to FIG. 4, the base 141 may be in the form of a thin plate formed of aluminum or a material containing aluminum. The base 141 may be formed of an aluminum 1000-based pure aluminum material, and a thickness thereof may be, preferably, 0.2 mm to 0.4 mm. The base 141 may be laser-welded to the case 110 along an edge thereof.

A notch portion 142 may be provided in the base 141. The notch portion 142, which is a unit that fractures earlier than other portions when the interior of the case 110 is at a predetermined pressure or higher, may have a thickness thinner than other portions for this purpose. Referring to FIG. 5, a continuous groove G may be formed on one surface of the base 141 in a shape corresponding to the notch portion 142. One surface of the base 141 may be a surface facing the interior of the case 110, and the groove G may have a predetermined width and depth.

According to the disclosed technology, because the gas generated in the case 110 is emitted through the venting unit 140 as the notch portion 142 is fractured, a gas emission direction may be controlled in view of the secondary battery cell 100.

According to an embodiment of the disclosed technology, the notch portion 142 may be generally formed in a shape similar to that of an alphabet 'H' as illustrated in FIG. 4.

The notch portion 142 may include a first notch portion 142a, a second notch portion 142b, and a third notch portion 142c having at least one of a length and an extension direction different from each other. The first to third notch portions 142a, 142b and 142c may be formed in the base 141 so that the notch portion 142 has the shape of the alphabet 'H' as a whole.

The first notch portion 142a may extend in a first direction, parallel to the longitudinal direction of the base 141, and may be disposed to pass through a center of the base 141. The first notch portion 142a may have the longest length among the first to third notch portions 142a, 142b, and 142c.

The second notch portion 142b may extend from both ends of the first notch portion 142a in a second direction perpendicular to the first direction (or in a direction that may be considered to be substantially perpendicular to the first direction). The second notch portion 142b may include a portion extending from one end of the first notch portion 142a and a portion extending from the other end of the first notch portion 142a, and one end and the other end of the first notch portion 142a may form an intersection point with the second notch portion 142b, respectively.

The third notch portion 142c may extend from both ends of the second notch portion 142b in the first direction (or in a direction that may be considered to be substantially parallel to the first direction). The third notch portion 142c may include a portion extending from one end and the other end of the second notch portion 142b intersecting one end of the first notch portion 142a, and a portion extending from one end and the other end of the second notch portion 142b intersecting the other end of the first notch portion 142a, respectively, and one end and the other end of the second notch portion 142b may form an intersection point with the third notch portion 142c, respectively.

According to an embodiment of the disclosed technology, the venting unit 140 may be designed to satisfy values presented in Table 1 below.

In the following Table 1, a may denote a length of the base 141, b may denote a width of the base 141, c may denote a length of the first notch portion 142a, d may denote a length of the second notch portion 142b, e may denote a length of the third notch portion 142c, and f may denote a gap between the first notch portion 142a and the third notch portion 142c. Furthermore, g1 may denote a width of the groove G, and g2 may denote a depth of the groove G. In Table 1 below, a value of g2 corresponding to the depth of the groove G in Table 1 may be a fixed value to which an error range is not applied.

TABLE 1

| Division | Value (Unit: mm) |
| --- | --- |
| a | 46.4 |
| b | 22.2 |
| c | 30 |
| d | 12 |
| e | 6 |
| f | 6 |
| g1 | 0.1 |
| g2 | 0.04 |

(Error Range: ±0.05)

The venting unit 140 according to an embodiment of the disclosed technology may be fractured when internal pressure of the case 110 is around 0.85 [MPa] (±0.05), as illustrated in the graph of FIG. 7. Fracture pressure may be determined by a shape of the notch portion 142, and the concept of the shape may include a length, a gap, a thickness of the notch portion 142, and an area of the groove G and the base 141. The venting unit 140 according to an embodiment of the disclosed technology may be designed to be fractured at the most desirable pressure in terms of improving battery lifecycle and ensuring safety.

Meanwhile, the venting unit 140 may have a stress distribution as illustrated in FIG. 6. When the internal pressure of the case 110 reaches around 0.85 [MPa], a portion on which stress of the venting unit 140 is concentrated may be fractured first. Referring to FIG. 6, the stress may be concentrated on a peripheral portion of the base 141 and the notch portion 142 rather than the center of the base 141, and accordingly, the weakest portion of the venting unit 140 may be the third notch portion 142c. Accordingly, in the case of reaching the aforementioned pressure, the third notch portion 142c may be fractured first.

As described above, the secondary battery cell 100 according to an embodiment of the disclosed technology may control the emission direction of gas through the venting unit 140, and the venting unit 140 may be fractured with high reliability in a predetermined specific fracture pressure range. Furthermore, a degree of freedom in design of the secondary battery cell 100 may be improved.

Although the configurations and characteristics of the disclosed technology have been described according to embodiments of the disclosed technology, the disclosed technology is not limited thereto, and it is apparent to those skilled in the art that various changes or modifications may be made within the concept and scope of the disclosed technology. Accordingly, such changes or modifications are also construed as being in the technical scope of the accompanying claims.

What is claimed is:

1. A secondary battery cell comprising:
a case in which an electrode assembly is accommodated;
a cap plate assembly coupled to at least one side of the case; and
a venting unit including a base facing an interior of the case and a notch portion formed on the base,
wherein the notch portion comprises:
a first notch portion extending in a first direction, parallel to a longitudinal direction of the base;
a second notch portion extending in a second direction, perpendicular to the first direction, from both ends of the first notch portion, respectively; and
a third notch portion extending in the first direction from both ends of the second notch portion respectively,
wherein the third notch portion is configured to concentrate stress in the base and disposed at a peripheral portion of the base.

2. The secondary battery cell of claim 1, wherein the venting unit is provided on at least one of two side surfaces facing each other in the longitudinal direction of the case and two side surfaces facing each other in a height direction of the case.

3. The secondary battery cell of claim 1, wherein the third notch portion extends in the first direction toward an inside of the base.

4. The secondary battery cell of claim 1, wherein the second notch portion extends in the second direction to at least a portion on which stress is concentrated in the base, and
the third notch portion extends in the first direction from a portion on which the stress of the base is concentrated.

5. The secondary battery cell of claim 1, wherein the notch portion is formed to satisfy the following conditional equation, $$64.4 \leq 100*c/a \leq 64.8, \quad \text{[Conditional Equation]}$$

where a is a length of the base, and c is a length of the first notch portion.

6. The secondary battery cell of claim 1, wherein the notch portion is formed to satisfy the following conditional equation, $$19.8 \leq 100*c/a \leq 20.2, \quad \text{[Conditional Equation]}$$

where c is the length of the first notch portion, and e is a length of the third notch portion.

7. The secondary battery cell of claim 1, wherein the notch portion is formed to satisfy the following conditional equation, $$53.7 \leq 100*d/b \leq 54.4, \quad \text{[Conditional Equation]}$$

where b is a width of the base, and d is a length of the second notch portion.

8. The secondary battery cell of claim 1, wherein the notch portion is formed to satisfy the following conditional equation, $$98.3 \leq 100*e/f \leq 101.7, \quad \text{[Conditional Equation]}$$

where e is the length of the third notch portion, and f is a gap between the first notch portion and the third notch portion.

9. The secondary battery cell of claim 1, wherein the base includes a groove formed along the first to third notch portions on a surface facing the interior of the case, and,
the groove is formed to satisfy the following conditional equation, $$0.26 \leq g2/g1 \leq 0.8, \quad \text{[Conditional Equation]}$$

where g1 is a width of the groove, and g2 is a depth of the groove.

10. The secondary battery cell of claim 1, wherein the venting unit is configured to be fractured when internal pressure (P) of the case satisfies the following conditional equation, $$0.80[MPa] \leq P \leq 0.90[MPa] \quad \text{[Conditional Equation]}.$$

11. The secondary battery cell of claim 1, wherein the base is disposed to one surface of the case.

12. The secondary battery cell of claim 1,
wherein at least a portion of the first notch portion disposed to pass through a center portion of the base, and at least a portion of the third notch portion disposed to pass through the peripheral portion of the base.

13. The secondary battery cell of claim 12, wherein the base is configured to fractured first at the peripheral portion rather than the center portion.

14. The secondary battery cell of claim 1, wherein an intersection point of the second notch portion and the third notch portion is disposed at the peripheral portion of the base,
wherein the third notch portion is extending from the intersection point to approach each other.

* * * * *